INVENTORS.
HOWARD C. BAUER,
ROBERT G. BELL &
ROBERT D. MITCHELL
BY  *Fay & Fay*
ATTORNEYS

INVENTORS.
HOWARD C. BAUER,
ROBERT G. BELL &
ROBERT D. MITCHELL
BY Fay & Fay
ATTORNEYS

INVENTORS.
HOWARD C. BAUER,
ROBERT G. BELL &
ROBERT D. MITCHELL
BY *Fay & Fay*
ATTORNEYS

INVENTORS.
HOWARD C. BAUER,
ROBERT G. BELL &
ROBERT D. MITCHELL
BY Fay & Fay
ATTORNEYS

INVENTORS.
HOWARD C. BAUER,
ROBERT G. BELL &
ROBERT D. MITCHELL
BY *Fay & Fay*
ATTORNEYS

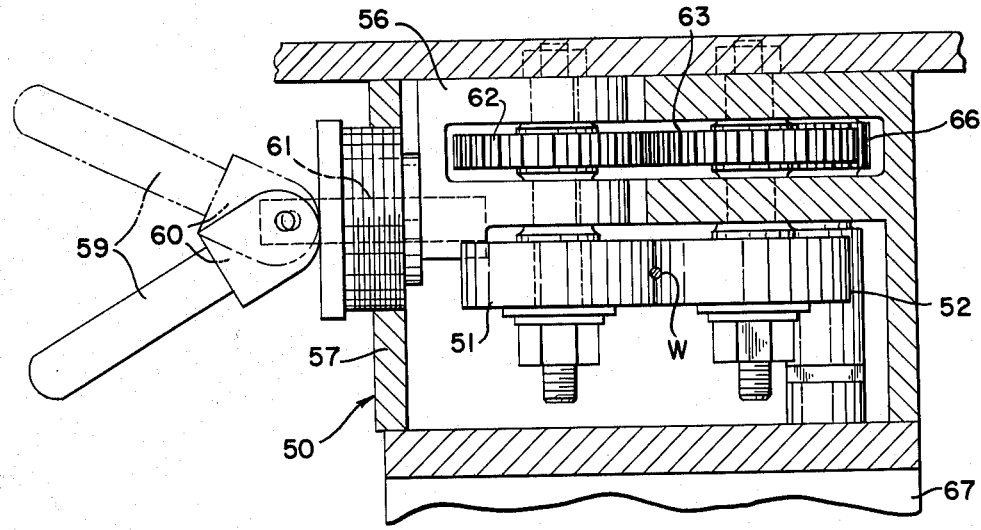
FIG. 7
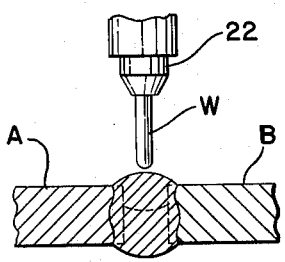
FIG. 9
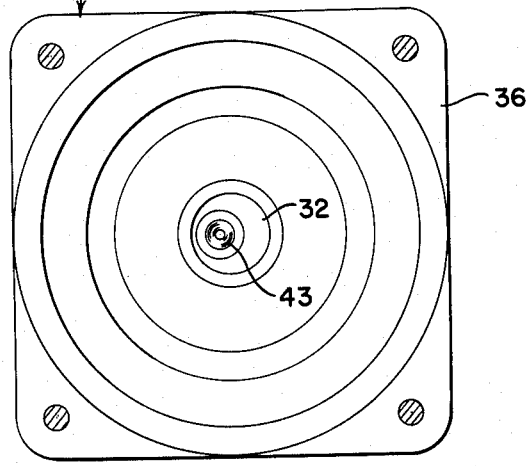
FIG. 8
FIG. 10
INVENTORS.
HOWARD C. BAUER,
ROBERT G. BELL &
ROBERT D. MITCHELL
BY *Fay & Fay*
ATTORNEYS United States Patent Office 3,256,418
Patented June 14, 1966

1

3,256,418
WIRE STRAIGHTENER AND FEEDER
Howard C. Bauer, Bedford, Ohio, Robert G. Bell, Calgary, Alberta, Canada, and Robert D. Mitchell, Solon, Ohio, assignors to Bauer & Associates, Inc., Solon, Ohio, a corporation of Delaware
Filed Dec. 10, 1964, Ser. No. 417,288
6 Claims. (Cl. 219—60)

This invention broadly relates to an assembly for effecting the welding of elongated sections of pipe in end-to-end relationship and, more particularly, to a mechanism for straightening and feeding the welding wire which is fed into the gap between the spaced apart ends of the sections of pipe for the welding operation.

It has become the practice in the pipeline industry to join adjacent sections of pipe by welding together the abutting ends of the sections. In recent years, means have been devised whereby this operation has been performed by a welding assembly mounted on a carriage, with the welding head being capable of welding automatically around the pipe at the joint between the pipe sections. This welding operation has been performed substantially automatically and has proven to be a decided improvement over the previous method of hand welding the joints between pipe sections.

There is disclosed in the patents to Rieppel et al. Nos. 3,084,244 and 3,084,246 a process for performing automatically the welding of the joint between aligned pipe sections. This process includes the steps of forming a gap of uniform width and depth between the adjacent ends of the pipe sections and causing a welding unit to traverse circumferentially the joint between the pipe sections. It is contemplated by this method that the welding unit will include means for feeding, with precision, a consumable electrode wire into the gap at a carefully controlled rate. The method contemplated in the aforementioned patents further includes the provision of an accurately machined gap of .060" between the spaced ends of the sections of pipe and the consumable wire electrode which is placed in the gap is ordinarily .045" in diameter. It is imperative that the wire be laid in the gap without contact between the wire and the sides of the gap. If such contact does occur, arcing will result and an improper weld will be produced. Moreover, the wire is fed from a reel and is unwound from this reel under conditions such that the wire is not perfectly straight and possesses attributes of torque which normally causes the wire to wander and gyrate as it is laid in the gap. Through utilization of the principles of this invention, the difficulties in controlling the feeding of the wire are minimized and a proper weld is assured.

It is an object of this invention to provide a wire straightener for use with a precision welding mechanism.

It is a further object of this invention to provide a wire straightener and feeder mechanism which may be used to control the feeding of consumable electrode wire.

Still another object of the invention is to provide a wire straightener which is usable with a deep groove sunken arc precision welding apparatus.

It is another object of this invention to provide a wire straightener and feeder mechanism in combination with a pipeline welding machine.

A more specific object of the invention is to provide

2 a wire straightening mechanism which, with feeding apparatus, may place wire of .045" to .050" diameter in a .060" groove without contact between the wire and the sides of the groove.

A more specific object of the invention is to provide a wire straightener to straighten wire in the order of .040–.050" diameter which straightener includes a plurality of eccentrically mounted counter-rotating dies through which the wire is fed as it is pulled from the reel.

Still a more specific object of the invention is to provide a short, compact and effective wire straightener that includes three stationary dies and two eccentric counter-rotating movable dies.

Another object of the invention is to provide a wire straightener in combination with a wire feeder comprised of a set of tandem rollers with a pressure regulating mechanism associated with the rollers to equalize the force pulling on the wire.

It is a further object of this invention to provide, in combination with a pipeline welding assembly, a wire straightener to eliminate torque in the consumable welding wire comprising three stationary dies and two eccentric counter-rotating movable dies and a wire pulling mechanism to pull said wire through the wire straightener and feed it to the welding head comprised of a set of tandem rollers with a pressure regulating device equalizing the force between each set of rollers.

Other objects and features will become more apparent upon a complete reading of the following description. To the accomplishment of the foregoing and related ends, the following description sets forth in detail one approved means of carrying out the invention. Such disclosed means is not meant to be limiting inasmuch as it constitutes but one of the various ways in which the principles of the invention may be applied.

In the drawings wherein like reference numerals indicate like parts in the various views:

FIG. 7 is a view taken along line 7—7 of FIG. 5;

FIG. 8 is a view taken along line 8—8 of FIG. 4 and illustrates the eccentric mounting of one of the movable dies in the wire straightener;

FIG. 9 is a schematic illustration of the spaced ends of the pipe sections and the application of the weld material in the gap; and FIG. 10 is a view similar to FIG. 9 illustrating a second pass of the welding head as a second weld is applied.

Figure 1:
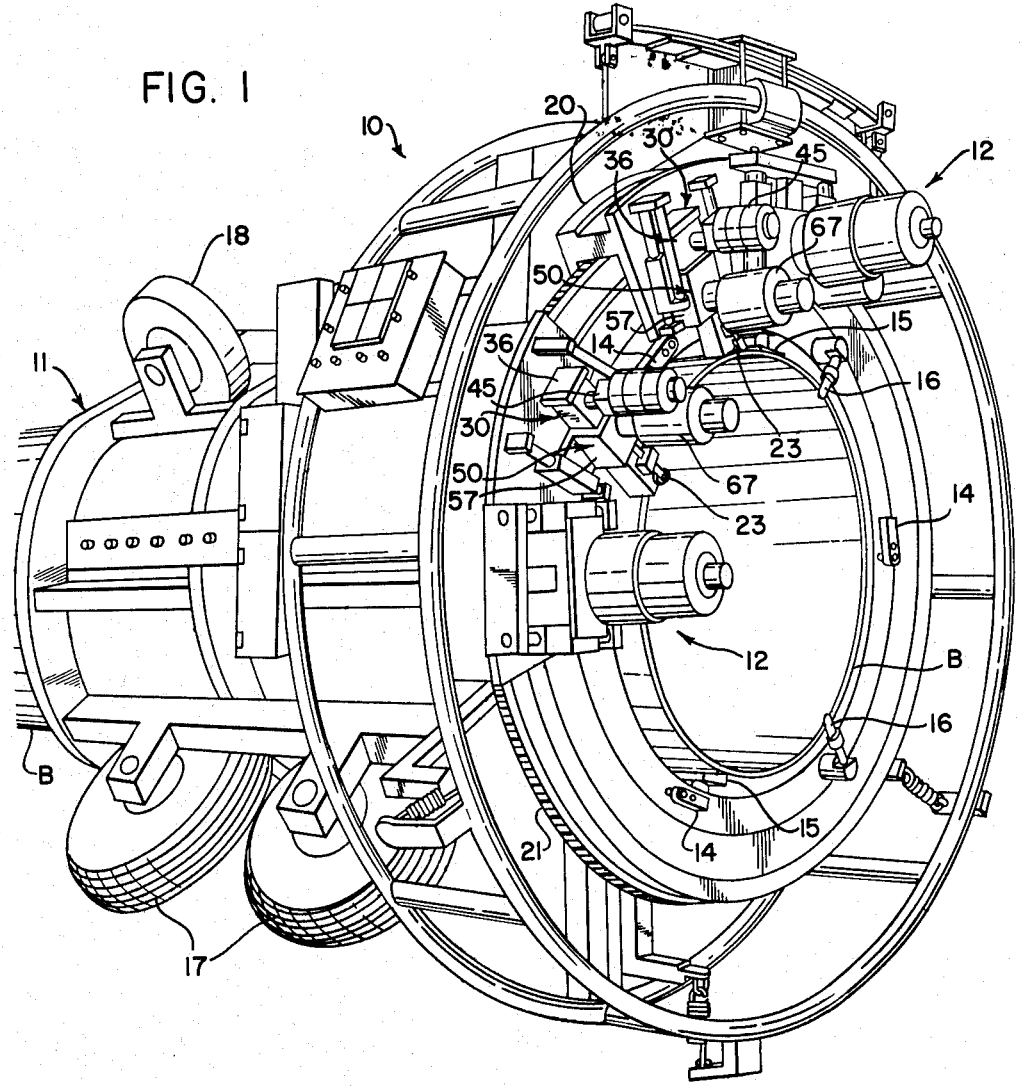
FIG. 1 is a perspective view of a pipeline welding apparatus which incorporates the principles of the instant invention.
Figure 2:
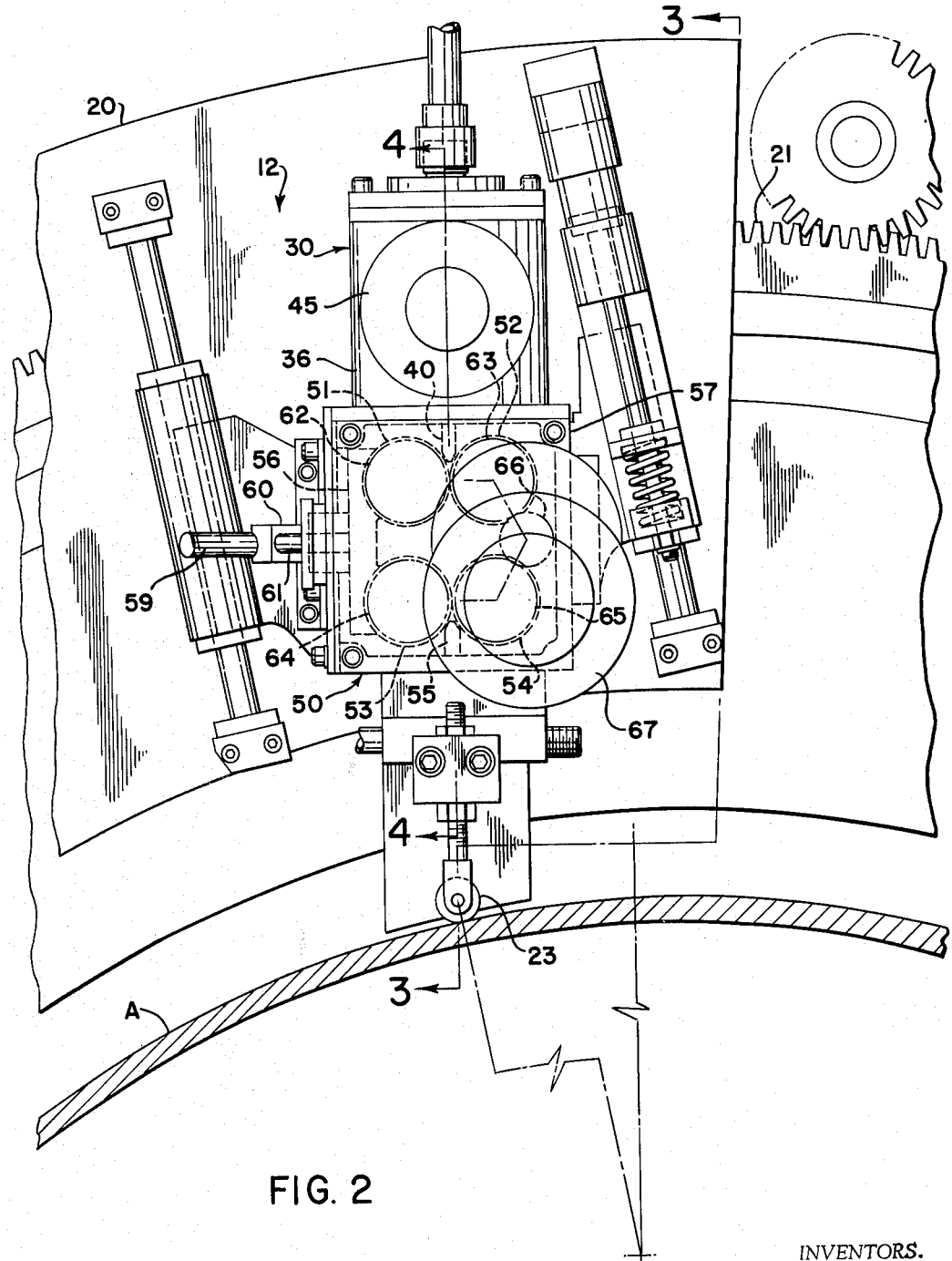
FIG. 2 is a side elevation view, partly in section, illustrating a portion of the welding head and the wire feeding mechanism.

Turning to the principles of the instant invention, there is shown in FIG. 1 an assembly, indicated generally by the reference numeral 10, which utilizes the wire straightener and feeder disclosed herein. This assembly includes, among other things, a mobile carriage 11 adapted to traverse the sections of pipe comprising the pipeline; a welding assembly including welding heads 12 supported by the carriage; centering means and locating means 14 also supported by the carriage adapted to locate the welding heads relative to the end of the pipeline; and a spacing device 16 adapted to space the pipeline from the end of the section of pipe to be added and a clamping mechanism 15 for securing the welding heads in position. The assembly 10 also includes such accessory items as panelboard controls and other equipment needed to carry out the welding operation, but these accessories comprise no part of the instant invention and are only shown schematically for purposes of completeness.

It will be understood that the assembly 10 is adapted to be received concentrically over a section of pipe with wheels 17, 18 on the carriage 11 contacting the external surface of the pipeline thereby supporting the assembly for movement therealong. Appropriate means are provided for driving the assembly along the pipeline so that the unit may be moved to the situs where it is desired to attach additional sections of pipe to the line. Once the assembly has been brought to the point where a joint is desired, it is necessary to locate the welding head relative to the end of the pipeline, clamp the head in position, orient the new section of pipe with the end of the line, clamp the new section of pipe in position, and weld the joint between the adjacent ends of the pipe. The specifics of the carriage assembly, the centering and locating mechanism and the clamping mechanism together with the spacing or gauging device comprise the subject of our co-pending application Serial No. 396,554, filed Sept. 15, 1964, and reference is made to this co-pending application for a complete discussion of this structure.

In general, there is supported by the carriage assembly on brackets 20 a pair of welding heads and cutter assemblies which have been indicated generally by the reference numeral 12. These welding heads are adapted to travel circumferentially of the pipeline on gear 21 in applying a weld to the joint. The details of this welding and cutter assembly comprise no part of this invention and reference may be made to the prior patents to Rieppel et al. for a more detailed disclosure.

The method for accomplishing the welding of the joints between adjacent ends of the pipes is disclosed in the above-mentioned Rieppel patents and includes the formation of a gap of uniform width and depth between the adjacent ends of the pipeline. The formation of the gap is accomplished by a cutter supported on the brackets 20. The spacing of the ends of the adjacent sections of pipe is illustrated in FIG. 9 wherein pipes A and B are shown spaced apart as the weld is being applied. The spacing of the adjacent ends is greatly magnified in FIG. 9 with the ordinary spacing X being on the order of .060". With the spacing of the pipes being completed, a sunken arc or submerged arc precision welding process is used to secure the pipes together. This is accomplished by laying in the gap a weld wire W which is rendered molten together with the adjacent material on the pipe ends. The wire is fed into the gap through a contact tube 22. A roller guide 23 associated with each head 12 guides the head in its circumferential travel.

Figure 4:
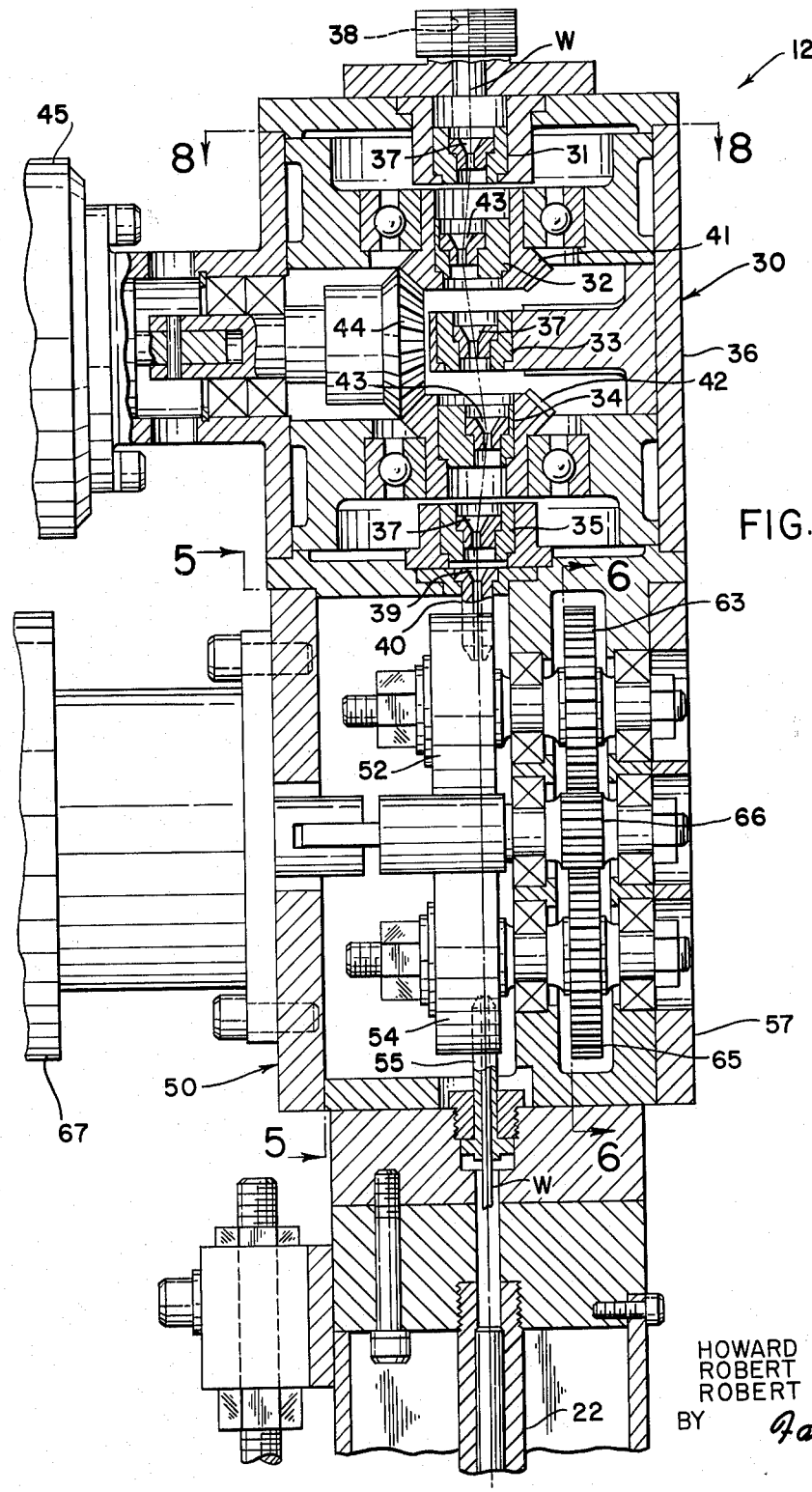
FIG. 4 is a view taken along line 4—4 of FIG. 2 and shows, in section, the details of the wire straightening mechanism and the wire feeder.

To assure that a proper weld is accomplished, it is important that the weld wire be placed in the gap with precision and that the wire not be in contact with the walls of the gap. The wire normally is stored on a reel and is not perfectly straight throughout its length and possesses a certain amount of torque, so that there is a tendency of the wire to gyrate or wander as it is laid in the gap. As a means for processing and controlling the wire, there is provided a mechanism shown in FIG. 4 which comprises a wire straightener 30 and a wire feeder, indicated generally at 50.

The wire straightener 30 comprises a plurality of dies 31, 32, 33, 34, 35. The dies 31, 33, 35 are affixedly secured in the housing 36. Each of the fixed dies includes a passage such as is indicated at 37 in die 31 which passage includes an entrance mouth and a through passage. An entrance passage 38 is provided in one end of the housing 36 coaxial with the passages in the fixed dies 31, 33, 35. Also coaxial is an exit passage 39 formed in a guide tube 40 supported in one wall of the housing.

In addition to the fixed dies 31, 33, 35, there is a pair of rotatable dies 32, 34 spaced on either side of the central die 33. These rotatable dies are eccentrically mounted in bevel gears 41, 42 with each of the dies 32, 34 including a passage 43 similar to the passage 37 in each of the fixed dies. The passages 43, due to the eccentricity of the dies 32, 34, are nonaligned with the fixed dies, as may be seen in FIG. 4. The gears 41, 42 are rotatably mounted in the housing 36 and are in meshing engagement with a drive gear 44. The gear 44 is operatively connected to a motor illustrated generally at 45. Since the bevelled gears 41, 42 are disposed on opposite sides of the drive gear 44, it is apparent that the two gears will be rotated in opposite directions. Thus, while one gear will be rotating clockwise, the other gear will be rotating counterclockwise relative to the wire passing through the dies.

With the combination of fixed and rotatable dies described, a welding wire is fed through the passage 38 into the housing 36. By virtue of the flared mouth construction on each of the dies, threading of the wire through the fixed and movable dies is greatly facilitated. The wire is passed through the opening in each of the dies and out through the exit passage 39. Operation of the motor 45 imparts rotation to the eccentrically mounted dies 32, 34. Rotation of these dies between the fixed dies imparts a straightening effect to the wire passing therethrough. Moreover, since the dies 32, 34 are counter-rotating, any torque imparted to the wire by the die 32 is equalized by an opposite torque imposed by the die 34. The result is a straight, essentially torque-free wire as it passes from the straightener.

The critical need for a straight, torque-free wire is best understood in the context of the dimensional relationships ordinarily present. Thus, the gap between the ends of the pipes is on the order of .060" and the wire normally has a diameter of .040–.050" leaving approximately .005" to .010" tolerance between the wire and the walls of the gap. Any torque possessed by the wire may conceivably cause the wire to gyrate or wander as it is laid in the gap and come into contact with the walls of the gap, resulting in arcing and improper penetration of the weld.

Figure 5:
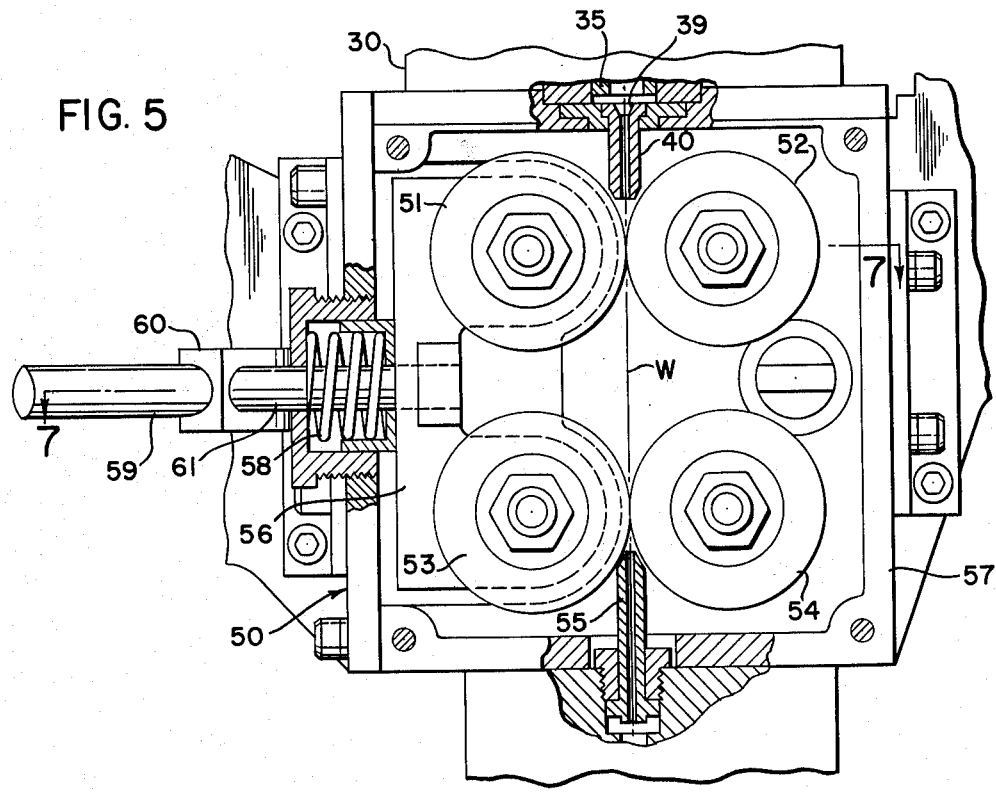
FIG. 5 is a view taken along line 5—5 of FIG. 4 illustrating the pressure equalizing mechanism for the wire feeder.

The weld wire W is drawn through the straightener 30 by a wire feed mechanism 50 which comprises a pair of tandem rollers shown in FIG. 5. Thus, the exit tube 40 feeds the wire from the straightener to a pair of rollers 51, 52 which rollers are immediately adjacent the end of the tube 40. The wire passes through the rollers as shown in FIG. 7, with the rollers, due to the frictional contact between the rollers and the wire, pulling the wire as the rollers are rotated. The wire is then fed into a second set of rollers 53, 54 which are identical to the rollers 51, 52. From the second set of rollers, the wire is passed through an exit tube 55 to the contact tube 22 and thence to the welding area.

The frictional contact of the rollers is maintained by the particular mounting of the rollers 51, 53. This mounting, which is shown in FIG. 5, comprises a support member 56 on which the rollers 51, 53 are rotatably journalled. The support member is movably mounted within the housing 57 and is biased by a spring 58 to a position wherein the rollers 51, 53 contact the rollers 52, 54 respectively.

It is believed apparent that the mounting of the rollers in the manner described permits the imposition of sufficient frictional forces on the wire to feed the wire through the straightener to the welding area. However, in the event that movement of the wire is blocked, the feed mechanism is designed so that slippage of the rollers on the wire will occur and feeding of the wire will be discontinued until the block has been removed. To facilitate the threading of the wire through the feed mechanism and also to discontinue the feed of the wire, a handle 59 with an overcenter cam 60 is engaged with a shaft 61 attached to support member 56. Referring to FIG. 7, it is apparent that pivoting action of the handle 59 to the dotted line position will cause retraction of the support member against the bias of the spring 58 thereby to separate the rollers 51, 53 from the rollers 52, 54.

Figure 6:
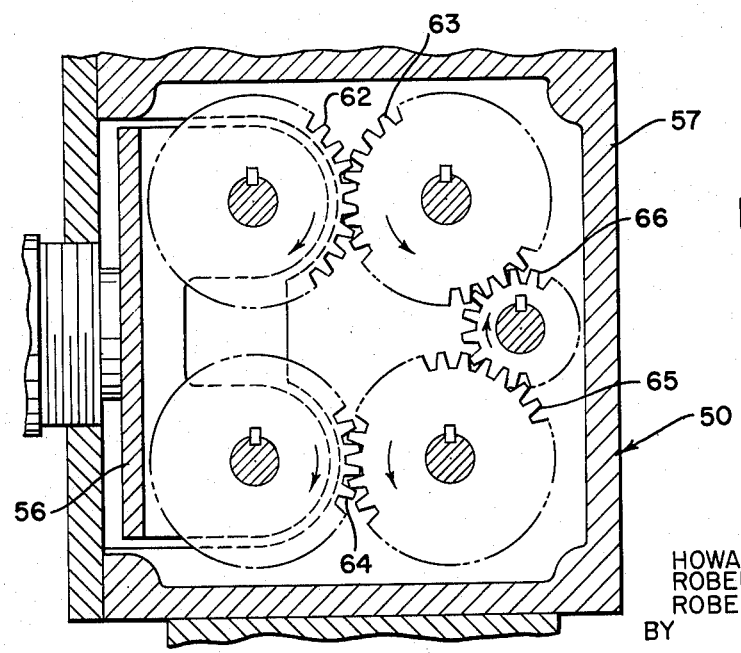
FIG. 6 is a view taken along line 6—6 of FIG. 4 and illustrates the drive mechanism for the wire feeder.

Drive means for the rollers is provided by the gear mechanism shown in FIG. 6 which includes gears 62, 63, 64, 65. The gears 62, 63 are intermeshing as are the gears 64, 65 and rotation is imparted to the gears by the pinion 66 which is in meshing engagement with the gears 63, 65. A suitable motor, indicated at 67, is in driving engagement with the pinion 66.

Figure 3:
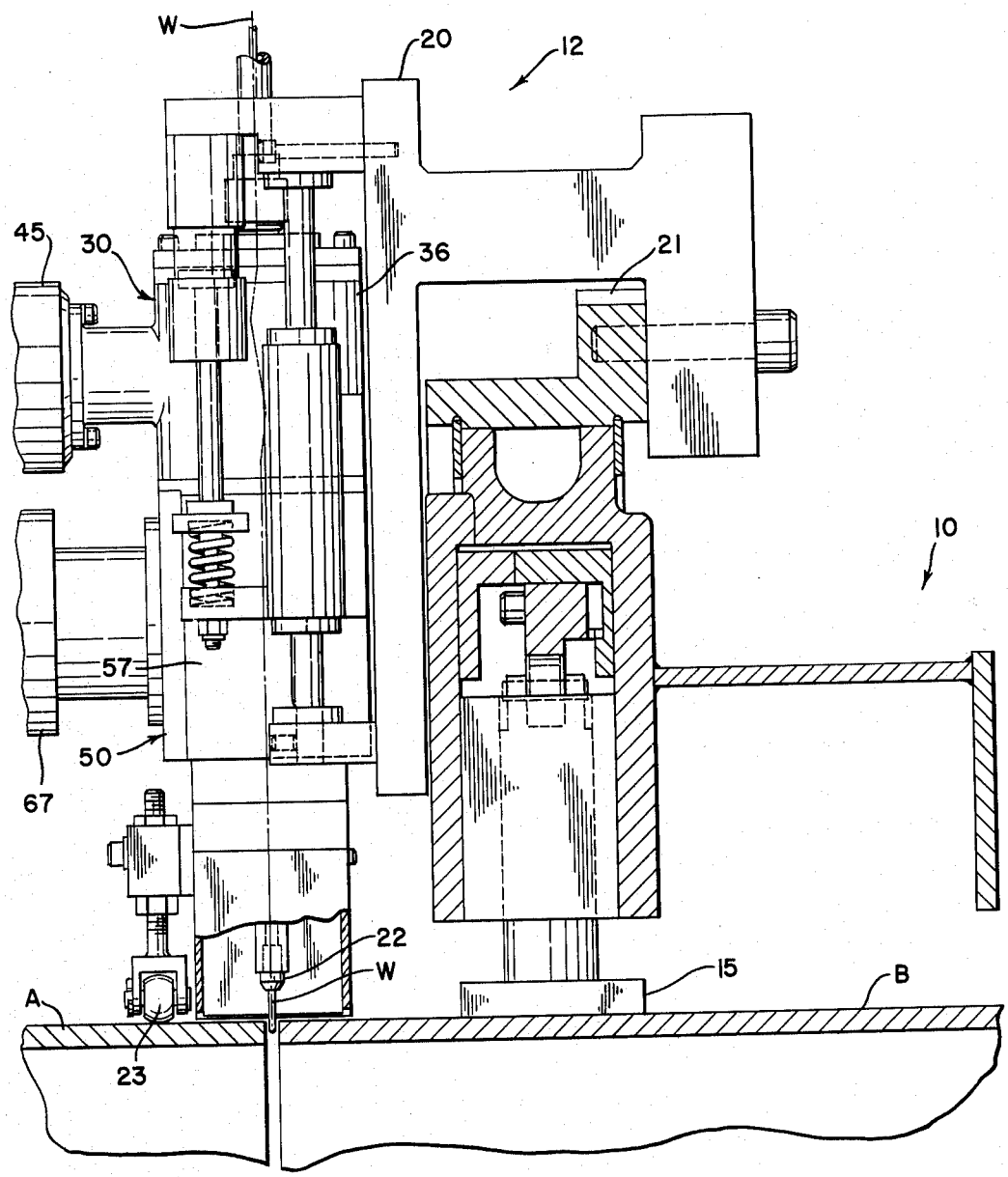
FIG. 3 is a view taken along line 3—3 of FIG. 2 and illustrates the spaced apart ends of the pipe sections in relation to the welding head.

In operation, the device hereinabove described is utilized as follows: The welding assembly 10 would be displaced along a pipeline to a point adjacent the end of the line where an additional section of pipe is to be attached. In this position, the welding head would be oriented relative to the end of the pipe and clamped in position such as by the clamp 15 shown in FIG. 3. The additional section of pipe would be maneuvered into position adjacent the end of the pipeline and an appropriate cutter carried by the welding assembly would form a gap between the ends of the pipes by removal of a portion of metal from each end. This gap, as shown for example in FIG. 9 at X, is approximately .060". With the formation of the gap completed, the welding process would commence. Without describing the details of the welding process, it is sufficient to state that the motors 45 and 67 would be actuated causing the actuation of the wire feeder 50 and the wire straightener 30. The wire feeder, due to the frictional contact between the rollers and the wire W, would pull the wire from the supply, through the straightener and feed it to the contact tube where it is placed in the gap X shown in FIG. 9. The dimension of the wire, as pointed out above, is in the order of .045 to .050" thus rendering the clearances between the walls of the gap and the wire extremely small. The wire straightener, as the wire is being pulled from the reel, operates on the wire to remove any irregularities in the wire. In addition, the counter rotation of the dies 32, 34 offsets any tendency to place torque in the wire due to the straightening process so that the emerging wire is not only straight but torque-free. Wire in this condition may then be laid with considerable accuracy in a gap such as the gap X in FIG. 9, and an accurate weld at the joint may then be effected.

Modifications and changes of the above-described apparatus will suggest themselves to those having ordinary skill in the art. Changes such as these are contemplated by the principles of this invention so that although for ease of description, the principles of the invention have been set forth in connection with but a single illustrated embodiment, it is not intended that this illustrated embodiment or the terminology employed in describing it is to be limiting, but rather, it is our desire to be restricted only by the scope of the appended claims.

We claim:
1. A wire straightener comprising:
a housing;
entrance and exit passages formed in said housing;
a plurality of spaced apart dies secured in said housing intermediate the entrance and exit passages;
each of said dies having a passage therethrough adapted to permit the passage of wire therethrough;
the passages in said dies being aligned with the passages formed in said housing;
a pair of dies rotatably mounted in said housing;
said rotatably mounted dies having passages adapted to permit the passage of wire therethrough with the passages being out of alignment with the aforementioned passages;
each of said rotatable dies being eccentrically mounted; and
drive means for rotating said rotatable dies in opposite directions.

2. The wire straightener of claim 1 and further including in combination therewith a feeder mechanism comprising:
a first pair of rollers rotatably supported in said housing adjacent the exit passage of said housing and adapted to receive a wire therebetween;
said rollers being in frictional rolling engagement with the area of contact of said rollers being in alignment with the exit passage;
a second pair of rollers rotatably supported in said housing spaced from said first set of rollers and adapted to receive a wire therebetween;
said second pair of rollers being in frictional engagement with the area of contact of said rollers being aligned with said exit passage and said area of contact of said first set of rollers; and
drive means extending into said housing for rotating said pairs of rollers thereby to draw wire through the straightener.

3. The combination of claim 2 and further including means mounting one roller from each of said pairs of rollers for movement toward and away from the other roller in each of said pairs of rollers.

4. The combination of claim 1 wherein said rotatable dies are mounted in said housing on opposite sides of one of the other of said dies.

5. In combination:
a welding assembly for welding together ends of adjacent sections of pipe comprising a carriage adapted to be received concentrically over a pipe;
means supporting said carriage for movement along said pipe;
said carriage including a movable welding head for securing together the ends of adjacent pipes;
said welding head being mounted on said carriage for movement circumferentially of said pipes;
said welding head including a contact tube through which a wire is passed and placed in a gap formed by the spaced apart ends of adjacent pipes;
a source of supply of said wire;
means for straightening said wire prior to said wire being fed into said contact tube from said source comprising:
said wire to said contact tube comprising:
a housing;
an entrance passage in said housing;
an exit passage from said housing adjacent to said contact tube;
a plurality of fixed die means secured in said housing in spaced apart aligned relationship;
each of said die means including a passage therethrough aligned with said entrance and exit passages in said housing;
and rotating die means in said housing comprising a pair of eccentrically mounted die means with passages therethrough misaligned with the passages through said fixed die means;
drive means for rotating said rotatable dies in opposite directions; and
means for feeding said wire from said straightening means to said contact tube comprising:
roller means in said housing adapted to frictionally engage a wire passing through said aligned die means;
drive means for said roller means whereby the frictional engagement of said roller means on the wire causes the wire to be fed through the housing to said contact tube.

6. The combination of claim 5 wherein said roller means comprises a pair of spaced apart sets of rollers.

References Cited by the Examiner

UNITED STATES PATENTS

| | | | |
|---|---|---|---|
| 2,894,111 | 7/1959 | McNutt | 219—60.1 |
| 3,029,845 | 4/1962 | Egedal | 140—147 |
| 3,084,246 | 4/1963 | Rieppel et al. | 219—60.1 |

WHITMORE A. WILTZ, *Primary Examiner.*

M. L. FAIGUS, *Assistant Examiner.*